(No Model.)

G. J. CAPEWELL.
BUTTON.

No. 487,345. Patented Dec. 6, 1892.

Witnesses
Wm. Musser.
G. B. Jenkins.

Inventor
George J. Capewell
By Chas L. Burdett,
Attorney

UNITED STATES PATENT OFFICE.

GEORGE JOSEPH CAPEWELL, OF CHESHIRE, CONNECTICUT.

BUTTON.

SPECIFICATION forming part of Letters Patent No. 487,345, dated December 6, 1892.

Application filed June 17, 1889. Serial No. 314,595. (No model.)

*To all whom it may concern:*

Be it known that I, GEORGE JOSEPH CAPEWELL, of Cheshire, in the county of New Haven and State of Connecticut, have invented certain new and useful Improvements in Buttons, of which the following is a full, clear, and exact description, whereby any one skilled in the art can make and use the same.

The object of my invention is to provide an improved button that is made with a spring shank or socket, which is preferably inclosed in a projecting casing, in part at least. For securing said button on cloth, leather, or other material I provide a flanged or headed pin or stud, which is to be passed through a hole in the material and driven into the socket in the shank of the button proper either by endwise pressure or by impact. When the stud is thus driven into the socket, it will be tightly held therein by frictional contact and by the forcible grip of the spring-shank upon the pin, so that it cannot be withdrawn without the application of considerable force. When the button is thus secured in the cloth or other material, the latter will be clamped between the flange or head of the stud or pin and the end of the shank of the flexible socket. My improved buttons have the advantage that they clamp in this manner materials of different thicknesses.

Figure 1:
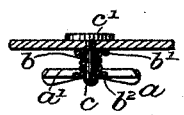
Figure 2:
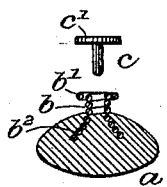

Referring to the drawings, Figure 1 is a detail view in central section of a button embodying my improvement. Fig. 2 is a detail view in central section of a modified form of the button, showing the headed pin removed from the socket.

In the accompanying drawings, the letter $a$ denotes the body or main portion of the button, which is made of metal, wood, or other suitable material that may be spun (if of sheet metal) or molded (if of plastic material) about the flanged end of the spring-shank.

$b$ is the spring-shank or socket-piece, made of wire coiled so as to provide a tubular socket, the walls of which are to a degree flexible and elastic. The headed pin $c$ is adapted for securing the button to the cloth or other material by passing it through a hole therein and thrusting the pin into the socket in the button-shank. This pin or stud is provided with a flange or head $c'$.

The spring shank or socket $b$, made of coiled wire, is provided with flanges $b'$ $b^2$, one at each end thereof, and a metal plate $a'$ may form the socket or cover for the body part, having its edge spun over the edge of the back piece that is applied to the under side of a flange $b^2$ and projects beyond it, the plate $a'$ forming the back of the body of the button and the flange $b^2$ of the socket-piece being held between the two plates. The cloth or other material is in this case clamped between the flange $b'$ and the head $c'$ of the pin or stud $c$.

In Fig. 2 the button, having a coiled-wire shank or socket $b$, formed with flanges $b'$ $b^2$, is firmly secured by its flange $b^2$ in the body $a$, which is made of hard india-rubber, gutta-percha, or other suitable plastic material that may be molded about the flange and in hardening be anchored securely thereto. The pin or stud $c'$ is made of such diameter that when driven into the socket in the shank it will be held there very tightly by frictional contact between its surface and the inner surface of the said shank or socket, the pin and the socket being made of such relative diameter as to secure the grasping action of the coiled spring that is slightly distended as the pin is thrust within the socket. The body $a$ may be made in any convenient manner and of any suitable material, metallic or otherwise, according to the purpose for which the button is required.

I am aware that buttons and studs have been made in two parts, one of which is provided with a pin adapted to fit into a slotted socket-piece, and that others have been made in which the pin has been broadened, so as to form a retaining-shoulder that slips past an inward projection within the socket and is thus anchored in place; but such constructions I do not claim, nor do I claim, broadly, the combination of the separable button parts, in which one of the pieces is provided with a socket and the other a pin adapted to be engaged and secured within the said socket.

By my invention I provide a button which is destined to be secured to cloth or other material and is so constructed that when thus secured it will firmly clamp the said material between the head of the pin and the end of the socket-piece, adapting itself to varying thicknesses of material. Moreover, in my improved button I do not depend upon the engagement of the spring-shank with a projection or enlargement on the pin, the parts in my improved button being held together tightly by a frictional contact caused by the grip of the spring, as above set forth, upon the comparatively smooth and regular surface of the pin.

I claim as my invention—

1. A separable button comprising two parts, a shank and shoe in the one part and a cap or button-front having a tubular socket $b$, formed of a coiled piece of wire with the integral flanges $b'$ $b^2$, located at opposite ends of the socket part, all substantially as described.

2. In combination, in a button, a shank or shoe composed of a headed pin or stud $c$, and the body $a$, comprising a spring shank or socket $b$, formed of a coiled spring-wire with integral flanges $b'$ and $b^2$ at opposite ends of the socket-piece, and a covering part secured to and embracing the outer coil of the flange $b^2$, all substantially as described.

GEORGE JOSEPH CAPEWELL.

Witnesses:
H. B. BACHARACH,
W. B. JENKINS.